United States Patent [19]

Marzocchi

[11] 3,773,546
[45] Nov. 20, 1973

[54] COATED GLASS FIBERS AND GLASS FIBER REINFORCED ELASTOMERS

[75] Inventor: Alfred Marzocchi, Cumberland, R.I.

[73] Assignee: Owens-Corning Fiberglas Corporation, Toledo, Ohio

[22] Filed: Nov. 26, 1971

[21] Appl. No.: 202,420

Related U.S. Application Data

[63] Continuation of Ser. No. 878,694, Nov. 21, 1969, abandoned.

[52] U.S. Cl. .............. 117/72, 65/3, 117/76 T, 117/77, 117/80, 117/126 GB, 117/161 L, 161/176, 260/29.3, 260/48, 260/845
[51] Int. Cl. ............................................. C03c 17/32
[58] Field of Search .............. 117/72, 161 L, 76 T, 117/126 GB; 161/176, 198; 156/335; 260/845, 846, 29.3, 48, 53

[56] References Cited

UNITED STATES PATENTS

| | | |
|---|---|---|
| 3,424,608 | 1/1969 | Marzocchi et al. .............. 117/72 |
| 3,538,972 | 11/1970 | Yvrcick et al. .............. 260/29.3 X |
| 1,960,262 | 5/1934 | Dreyfus et al. .............. 260/63 |

*Primary Examiner*—Ralph Husack
*Attorney*—Herman I. Hersh et al.

[57] ABSTRACT

The improvement in the bonding relationship between glass fibers and elastomeric materials in the manufacture of glass fiber reinforced elastomeric products wherein the individual glass fibers are sized and/or bundles of previously sized glass fibers impregnated with a composition containing a resinous material formed by the reaction of an aldehyde with phenolic compound having a mercapto or thio substituent in the meta or para positions.

33 Claims, 4 Drawing Figures

INVENTOR
Alfred Marzocchi
By Staelin & Overman
Att'ys

3,773,546

COATED GLASS FIBERS AND GLASS FIBER REINFORCED ELASTOMERS

This is a continuation of copending application Ser. No. 878,694, filed Nov. 21, 1969, now abandoned.

This invention relates to elastomeric products reinforced or otherwise combined with glass fibers and it relates more particularly to the method and compositions employed in the treatment of the glass fibers to enhance the bonding relationship between the glass fibers and the elastomeric materials for making fuller utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass molting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strand, yarn, cord and fabrics formed thereof.

As used herein, the term "elastomer" is intended to mean and include natural rubber in the cured and uncured stage, vulcanized or unvulcanized stage, and synthetic organic elastomeric materials such as styrene, nitriles, acrylic and esters and terpolymers thereof with styrene and acrylonitriles; styrene and vinyl pyridine; and EPDM rubbers as represented by butadiene polymers and copolymers with monoolefins such as butadiene-styrene copolymer, butadiene-acrylonitriles copolymer, butadiene-styrene-vinyl pyridine terpolymer, chloroprene, isoprene, neoprene, isobutyl rubber and the like elastomeric polymers and copolymers in their cured or uncured stages, and vulcanized or unvulcanized stages.

The invention is addressed to the fuller utilization of the desirable characteristics of glass fibers, such as their high strength, flexibility, thermal stability, chemical stability, inertness, electrical resistance and heat conductive characteristics when used in combinations with elastomeric materials as a reinforcement or as a stabilizing agent in belt manufacture, as reinforcing cords and fabrics to increase strength, life, wearability, and service characteristics in rubber ties, and as a reinforcement and the like in other elastomeric coated fabrics and molded elastomeric products.

It is an object of this invention to provide a new and improved composition which may be used as a forming size for treatment of glass fibers in forming or preferably as an impregnating composition for treatment, in forming or afterwards, of bundles, yarns, cords, strands and fabrics formed of glass fibers to enable fuller utilization to be made of the desirable characteristics of the glass fibers when used in combination with elastomeric materials in the manufacture of glass fiber reinforced molded products and coated fabrics.

More specifically, it is an object of this invention to provide a composition for use in the treatment of glass fibers in forming to improve the processing and the performance characteristics of the glass fibers as a reinforcement for elastomeric materials and for use in the treatment of bundles, strands, yarns, cords and fabrics of glass fibers, in forming or afterwards, to enhance their bonding relationship when used in combination with elastomeric materials in the manufacture of glass fiber reinforced plastics, laminates or coated fabrics and it is a related object to provide a method and means for making fuller utilization of the strength properties of glass fibers when used as a reinforcement for elastomeric materials.

These and other objects and advantages of this invention will hereinafter appear and, for purposes of illustration, but not of limitation, an embodiment of the invention is shown in the accompanying drawing in which FIG. 1 is a flow diagram showing the manufacture of continuous glass fibers and the treatment thereof in forming to improve the processing characteristics of the glass fibers and to improve the performance characteristics of the glass fibers when used in combination with elastomeric materials in the manufacture of glass fiber reinforced elastomeric products;

Figure 1:
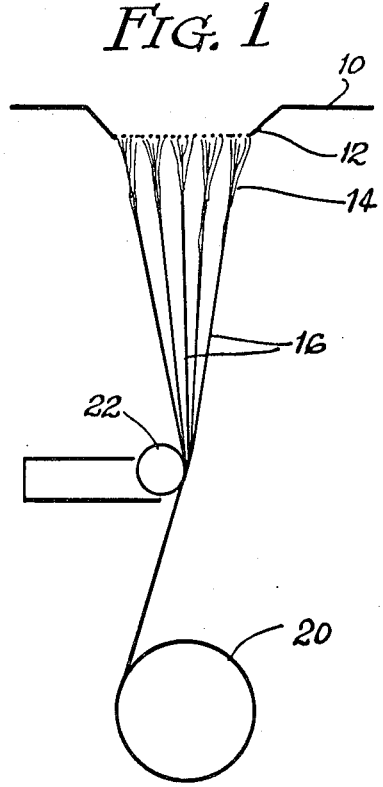

To the present, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in the attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

In copending application Ser. No. 398,305, filed Sept. 22, 1964, now abandoned, and entitled "Glass Fiber Reinforced Elastomers," description is made of a composition and method for treating glass fibers for use in glass fiber-reinforced elastomeric materials to provide a coating on the surfaces of the glass fibers to enhance the bonding relationship between the glass fibers and the elastomeric material, wherein the composition contains an aqueous dispersion in which the solids comprise a natural rubber latex — resorcinol formaldehyde resin.

It has been found that the utility of the resorcinol—aldehyde type resin, when used alone or in combination with natural or synthetic rubber as a component of a glass fiber size or impregnating composition, for improving the bonding relation between glass fibers and elastomeric material in the manufacture of a glass fiber reinforced plastic, can be greatly increased when the resorcinol or other phenolic group of the phenolic aldehyde resin forming material is found with a thio or mercapto group in the para or meta position of the phenolic nucleus.

The invention will be described with reference to a new and improved composition and method for using same which can be employed as an original size applied to the glass fibers in forming to thereby individually coat each of the glass fiber filaments subsequently formed into the strand, yarn, cord, or fabric to provide both the desired processing and performance characteristics for processing the sized fibers in the formation of the strand and in the twisting and plying of the strands into yarns or cords and in the processing of the strands, yarns, or cords into fabrics and the desired performance characteristics for enhancing the bonded relationship when the sized glass fibers are combined with elastomeric materials in the manufacture of reinforced elastomeric products.

In the preferred practice of this invention, the composition is formulated as an impregnating composition for treatment of strands, yarns, cords and fabrics formed of previously sized glass fibers for penetration of the treating composition into the strand, yarn, cord or fabric with the intention of individually coating the fibers to protect the fibers against destruction by mutual abrasion while establishing a bonded relationship therewith or else penetrating the glass fiber strand, yarn, cord or fabric sufficiently to intertie the glass fiber system with the elastomeric materials with which the glass fibers are combined in the manufacture of glass fiber-elastomeric products.

The following examples will serve to illustrate the principle concepts of this invention in a composition and method for the treatment, as by impregnation, of bundles, yarns, cords, and fabrics of glass fibers wherein the fibers have previously been sized in forming with a conventional size composition which has preferably been modified to embody a glass fiber anchoring agent.

EXAMPLE 1

Forming Size Composition 8.0% by weight partially dextrinized starch
1.8% by weight hydrogenated vegetable oil
0.4% by weight cationic wetting agent (lauryl amine acetate)
0.2% by weight nonionic emulsifying agent
1.0% by weight gamma-aminopropyltriethoxy silane
88.6% by weight water

EXAMPLE 2

Forming Size Composition 3.2% by weight saturated polyester resin
0.1% by weight fatty acid amine wetting agent (Nopcogen 16L)
0.1% by weight polyvinyl alcohol
3.0% by weight pyrrolidine
0.3% by weight gamma-aminopropyltriethoxy silane
0.1% by weight glacial acetic acid
93.2% by weight water

EXAMPLE 3

Forming Size Composition 0.2% by weight paraffin wax in aqueous emulsion
1.3% by weight cationic amide polyester resin
2.3% by weight polyglycol condensate (300 to 400 m.w.)
0.25% by weight gelatin
0.5% by weight gamma-aminopropyltriethoxy silane
0.1% by weight dibasic ammonium phosphate
0.2% by weight glacial acetic acid
95.15% by weight water Referring now to the schematic diagram of FIG. 1, the glass is melted in a glass melting furnace 10 having a bushing 12 on the bottom side. The bushing is formed with a plurality of openings extending therethrough and the molten glass flows gravitationally through the hundreds of small openings in the bushing to form therein streams 14 which are rapidly attenuated into fine glass filaments 16 by winding the filaments about a rapidly rotating drum 20. The filaments 16 are sized with one of the size compositions of Examples 1 to 3 as they are gathered together to form a strand. For this purpose, use is made of an applicator 22 which is illustrated as a wiping pad that is constantly wet with the forming size composition. The filaments of glass are each wet with the size composition as they are gathered together to form the strand 18 that is wound about the drum 20.

The sized strands are allowed to air dry or drying of the thin size coating can be accelerated by exposure to elevated temperatures such as a temperature within the range of 150° to 250°F. The applied size forms a very thin coating 24 on the surface of the glass fibers 16 to impart a desired balance of lubricity and bonding without destroying the fibrous characteristics or appearance of the fiber.

The strand 18 of sized glass fibers is preferably plied with other strands and twisted to form yarns, threads, or cords which may be used as a reinforcement for elastomeric materials, with or without cutting to shorter lengths, and which can be formed into woven or nonwoven fabrics for subsequent combination with elastomeric materials.

After the fibers have been processed into strands, yarns, cords or fabrics, hereinafter referred to generally as bundles, the bundles of sized glass fibers are impregnated with a composition embodying the features of this invention, as represented by the following examples.

EXAMPLE 4

Figure 2:
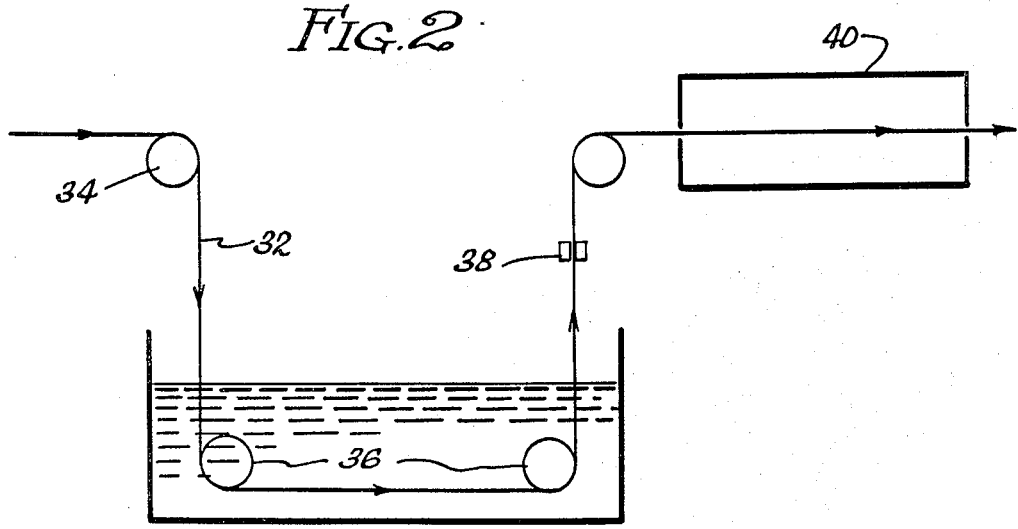
FIG. 2 is a flow diagram illustrating the treatment of glass fibers subsequent to their being formed into bundles, strands, yarns, cords or fabrics to impregnate the glass fiber bundles in accordance with the preferred practice of this invention.

Impregnating Composition 30.0 parts by weight mercaptophenol-formaldehyde resin (70% solids)
100.0 parts by weight water Impregnation with the aqueous composition of Example 4 can be made by way of a solvent brushing, but it also can be achieved by other conventional means for impregnation, such as by immersion of the bundles of glass fibers in a bath of aqueous impregnating composition. Referring more specifically to FIG. 2 of the drawing, the glass fiber bundle 32 is advanced over a guide roller 34 for passage downwardly into the bath 35 containing the impregnating composition of Example 4. The bundle is then turned under roller 36 to effect a sharp bend which operates to open the bundle to enable fuller penetration of the aqueous impregnating composition into the bundle of sized fibers for fuller impregnation of the bundle. The impregnated bundle is then raised from the bath for passage through a roller or die 38 which operates to remove excess impregnating composition from the bundle and to work the impregnating composition into the bundle. Thereafter the endless bundle is advanced over the roller 39 into a drying oven preferably in the form of an air drying oven maintained at a temperature above ambient temperature and preferably at a temperature within the range of 150° to 350°F to accelerate removal of the aqueous diluent and to set the impregnating material in situ in the glass fiber bundle. Drying will occur in a relatively short period of time, ranging from 1 to 30 minutes, depending somewhat upon the temperature of drying.

The mercaptophenol formaldehyde resin comprises the condensation reaction product of mercaptophenol and formaldehyde in an equivalent ratio of two to one or in the mole ratio of about one to eight under the same general reaction conditions utilized in the production of conventional phenol-formaldehyde resins. It will be understood that various other sulfur-containing phenolic compounds may be condensed with an aldehyde, or a compound capable of releasing an aldehyde under the reaction conditions to form other resins suitable for use in the present invention. Illustrative are 4-(methylthio) cresol and 4-(methylthio) phenol. In general, any phenol having a mercapto- or thio substituent such as a lower alkyl thio substituent wherein the alkyl group is methyl, ethyl, propyl, etc., in the meta or para positions, may be used to form the resins of the present invention.

The amount of the resin in the dispersion is not critical and can generally be varied within the range of 2 to 50 percent by weight of the solution. It is generally preferred that the solids content of the solution vary from 10 to 50 percent and the composition be applied in an amount to impregnate the glass fibers with dry solids containing 5 to 25 percent by weight dry solids based upon the glass fiber system.

It is also possible to utilize the resins of the composition of the present invention in combination with elastomeric materials. A composition of the same general type as is disclosed in U.S. Pat. No. 3,424,608, can be formulated as follows:

EXAMPLE 5

| | Parts by Weight |
|---|---|
| Mercaptophenol formaldehyde resin (70%) solids) | 2–10 |
| Formaldehyde (37% solution) | 1–3 |
| Concentrated ammonium hydroxide | 2–5 |
| Vinyl pyridine terpolymer (42% solids) | 15–50 |
| Butadiene latex (60% solids) | 5–15 |
| Alkali metal hydroxide | .05–0.2 |

The sulfur-containing resins of the present invention can similarly be used in combination with a natural rubber latex of the type disclosed in my copending application Ser. No. 398,305, filed Sept. 22, 1964, and entitled "Glass Fiber Reinforced Elastomers," now abandoned, as disclosed in the following example:

EXAMPLE 6

| | Parts by Weight |
|---|---|
| 4-(thiomethyl) phenol-formaldehyde resin (70% solids) | 10–60 |
| Natural rubber latex (50% solids) | 10–30 |
| Water | 80–20 |

It will be understood that compositions containing the sulfur-containing resins of the present invention may be used in the form of a hot melt or with a hot melt containing elastomers and/or resins of the type disclosed in my copending application Ser. No. 602,241, filed Dec. 16, 1966, and entitled "Treated Glass Fibers for Glass Fiber-Elastomeric Products and Method", now abandoned.

EXAMPLE 7

100 percent 4-(methylthio) phenol-formaldehyde resin.

A hot melt of this resin can be used to treat glass fibers in accordance with the method disclosed in the aforementioned copending application to form on the surfaces of the fibers a thin coating having a thickness in the range of 0.25 to 2.0 mils.

Other illustrations of this concept of the invention are hot melts of the following compositions:

EXAMPLE 8

50 – 80 percent neoprene rubber
50 – 20 percent mercaptophenol-formaldehyde resin

EXAMPLE 9

50 – 80 percent polyamide resin
50 – 20 percent mercaptophenol-formaldehyde resin It will be understood that various other resinous materials such as polyepoxide resins and polyester resins, such as those formed by the reaction of a polybasic acid, e.g. phthalic anhydride, maleic, fumaric acid and the like, with a polyhydric alcohol such as glycerin glycol and the like, the polyesters may be used alone or in combination with a polyurethane.

It is desirable to achieve as full impregnation as possible into the bundles of glass fibers in order more effectively to separate the fibers one from the other by the impregnating materials since the solids are effective as a coating on the sized glass fibers to cushion the fibers and to protect the fibers against destruction by mutual abrasion. Thus it is desirable to achieve as deep a penetration as possible with the impregnating composition into the glass fiber bundle. The deeper the penetration, the more effective will be the bond between the glass fibers in the bundle and the elastomeric material with which the bundles of glass fibers are combined in the subsequent manufacture of the glass fiber-elastomeric product.

In the final system, the elastomeric material with which the glass fibers are combined with constitute a continuous phase. Such continuous phase of elastomeric material may comprise rubbers of the type incorporated into the impregnating composition or the elastomeric material can differ therefrom. The continuous phase of elastomeric material can be employed in the cured or uncured state or in the vulcanized or unvulcanized state. It is believed that the tie-in between the impregnated bundles of glass fibers and the elastomeric material forming the continuous phase will occur primarily during cure or vulcanization of the elastomeric material during the fabrication of the elastomeric material.

More complete protection for the individual glass fibers and a fuller coordination with the elastomeric material in the continuous phase can be achieved when the impregnating compositions of Examples 4 to 9 are modified for treatment of the glass fibers as a size composition which can be applied to the individual glass fibers as they are formed, as illustrated in FIG. 1 of the drawing, or afterwards if the original size is removed. For this purpose, the impregnating composition of this invention should be formulated to include an anchoring agent, such as gamma-amino-propyltriethoxy silane. Instead of gamma-aminopropyltriethoxy silane, in the size or in the impregnating composition, use can be made of other organo silicon compounds in which the organic group attached to the silicon atom contains an amino group, such as gamma-amino-vinyldiethoxy silane, gamma(triethoxysilylpropylamide)propylamine, N(gamma-triethoxysilylpropyl)propylamine, beta-aminoallyltriethoxy silane, and para-aminophenyltriethoxy silane. Use can be made of other organo silicon compounds in the form of a silane, silanol or polysiloxane in which the organic group attached to the silicon atom contains an epoxy group, such as glycydoxypropyltrimethoxy silane or 3,4-epoxycyclohexylethyltrimethoxy silane. Instead of the organo silicon compounds, use can be made of a Werner complex compound in which the carboxylato group coordinated with the trivalent nuclear chromium atom contains an amino group or any epoxy group such as aminopropylato chromic chloride, glycine chromic complex, beta-alanine chromic complex, or glycylate chromic chloride.

A forming size embodying the further concepts of this invention can be formulated as follows:

EXAMPLE 10

| | Parts by Weight |
|---|---|
| Mercaptophenol-formaldehyde resin (70% solids) | 5–40 |
| Anchoring agent | 0.1–3.0 |

To the foregoing composition, water is added to form an aqueous dispersion in an amount to provide for a solids content within the range of 20 to 45 percent by weight. Application should be made in an amount to deposit dry solids of 2 to 20 percent by weight of the sized glass fibers.

EXAMPLE 11

| | Parts by Weight |
|---|---|
| Mercaptophenol-formaldehyde resin | 2.0 |
| Formaldehyde (37% solution) | 1.0 |
| Concentrated ammonium hydroxide | 2.7 |
| Vinyl pyridine terpolymer latex (42% solids) | 25.0 |
| Neoprene rubber latex (50% solids) | 41.0 |
| Butadiene latex (60% solids) | 5.0 |
| Sodium hydroxide | .05 |
| Gamma-aminopropyltriethoxy silane | 1.0 |
| Water | 1100 |
| Tetramethyl ammonium hydroxide | 1.0 |

EXAMPLE 12

| | Parts by Weight |
|---|---|
| 4-(thiomethyl) metacresol (70% solids) | 30.0 |
| Natural rubber latex (50% solids) | 30.0 |
| Gamma-aminopropyltriethoxy silane | 1.0 |
| Water | 40.0 |

It will be similarly understood that use can be made of the various anchoring agents of the present invention in hot melts containing the sulfur-containing formaldehyde resins of the present invention. Such compositions can be formulated as follows:

EXAMPLE 13

| | Parts by Weight |
|---|---|
| 4-(methylthio)phenol-formaldehyde resin | 99.0 |
| Anchoring agent | 1.0 |
| Tetraethanol ammonium hydroxide | 1.0 |

EXAMPLE 14

| | Parts by Weight |
|---|---|
| Polyamide resin | 60.0 |
| Mercaptophenol formaldehyde resin | 39.0 |
| Anchoring agent | 1.0 |
| Tetramethyl ammonium hydroxide | 1.0 |

The compositions of Examples 11, 13 and 14 are preferably formulated to contain a quaternary ammonium hydroxide, such as tetramethyl ammonium hydroxide or tetraethanol ammonium hydroxide, to provide better stability and solubility.

In the size compositions of Examples 10 through 14, the anchoring agent can be employed in an amount within the range of 0.1 to 3.0 percent by weight of the size composition, and preferably 0.1 to 1.0 percent by weight.

Figure 3:
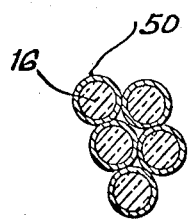
FIG. 3 is a cross-sectional view of glass fibers processed in accordance with the diagram illustrated in FIG 1.
Figure 4:
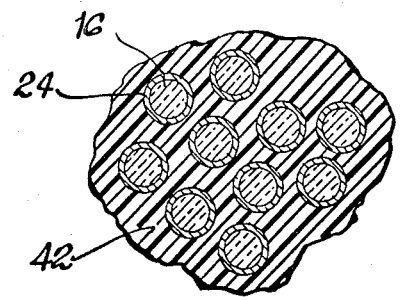
FIG. 4 is a cross-sectional view of a bundle of glass fibers processed in accordance with the flow diagram of FIG. 2.

When the glass fibers are sized in forming with a composition embodying features of this invention, the sized fibers can be processed directly into sized yarns, strands, cords or fabrics, or used alone in combination with elastomeric materials without the need for impregnation of the bundles of glass fibers since individual fibers 16 of the bundle are already provided with a coating 50 (FIG. 3) formulated to contain the desired components for anchoring the elastomeric material and for protecting the glass fibers to enhance their processing and their performance characteristics.

In fabricating the combinations of the glass fibers treated in accordance with the practice of this invention, with elastomeric materials, the glass fibers or bundles of glass fibers are mixed with elastomeric material or otherwise laid down in the desired arrangement for combination with the elastomeric material as in the manufacture of glass fiber reinforced belts or in the manufacture of rubber tires reinforced with cords of glass fibers. The combination of glass fibers and elastomeric material is processed in a conventional manner by molding or cure under heat and compression or by vulcanization for advancement of the elastomeric material to a cured or vulcanized stage while in combination with the treated glass fibers whereby the glass fibers or bundles of glass fibers become strongly integrated with the elastomeric material in the glass fiber-elastomeric product.

It will be understood that the size compositions, represented by Examples 10 to 14, may also be employed as impregnating compositions, preferably with lesser dilution with aqueous medium, since the anchoring agent embodied in the size composition will continue to operate as an anchoring agent further to facilitate the bonding relationship or integration between the elastomeric material of the continuous phase and the treated glass fibers.

It will be apparent that we have provided a new and improved composition for use in the treatment of glass fibers and bundles of glass fibers to enhance their integration with elastomeric materials in the manufacture of glass fiber-elastomeric products.

It will be understood that invention exists not only in the composition for use in the treatment of the glass fibers to prepare the glass fibers for combinations with elastomeric materials but that invention exists also in the process in which the compositions are employed in the treatment of glass fibers as well as the treated or impregnated glass fiber products formed thereof.

It will be understood that changes may be made in the details of formulation and methods of application or use without departing from the spirit of the invention, especially as defined in the following claims.

I claim:

1. Glass fibers having a thin coating thereon, said coating comprising a resinous material formed by the condensation reaction of an aldehyde with a phenolic compound having a substituent selected from the group consisting of mercapto and thio substituents in the meta or para positions.

2. Glass fibers as defined in claim 1 wherein said phenolic compound is selected from the group consisting of mercaptophenol, 4-(methylthio) metacresol and 4-(methylthio) phenol.

3. Glass fibers as defined in claim 1 wherein said coating is present in an amount corresponding to 5 to 25 percent by weight of the glass fibers.

4. Glass fibers as defined in claim 1 wherein said coating also contains an elastomer.

5. Glass fibers as defined in claim 1 wherein said coating also contains vinyl pyridine terpolymer and a butadiene latex.

6. Glass fibers as defined in claim 1 wherein said coating also contains natural rubber latex.

7. Glass fibers as defined in claim 1 wherein said coating also contains a resin selected from the group consisting of polyamides, polyesters, polyepoxides and a mixture of polyamides with polyurethanes.

8. Glass fibers as defined in claim 1 wherein said coating also contains an anchoring agent.

9. Glass fibers as defined in claim 8 wherein said anchoring agent is gamma-aminopropyltriethoxy silane.

10. In the manufacture of glass fiber elastomeric products in which the elastomer comprises a continuous phase in which the glass fibers are distributed, wherein the improvement comprises the treatment of glass fibers to provide a coating on the surfaces thereof which is effective to establish a strong bonding relationship between the glass fibers and the elastomeric material comprising forming a coating on said glass surfaces, said coating comprising a resinous material formed by the condensation reaction of an aldehyde with a phenolic compound having a substituent selected from the group consisting of mercapto and thio substituents in the meta or para positions.

11. A method as defined in claim 10 wherein said coating also contains an elastomer.

12. A method as defined in claim 10 wherein said coating is applied to said surfaces in the form of a hot melt.

13. A method as defined in claim 10 wherein said coating also contains an anchoring agent.

14. An elastomeric product comprising an elastomer as the continuous phase and glass fibers distributed within the continuous phase of the elastomer and a thin coating on the surfaces of said glass fibers to enhance the bonding relationship between the elastomer and said surfaces, said coating comprising a resinous material formed by the reaction of an aldehyde with a phenolic compound having a substituent selected from the group consisting of mercapto and thio substituents in the meta or para positions.

15. A product as defined in claim 14 wherein said phenolic compound is selected from the group consisting of mercaptophenol, 4-(methylthio) metacresol and 4-(methylthio) phenol.

16. A product as defined in claim 14 wherein said coating also contains an elastomer.

17. A product as defined in claim 14 wherein said coating also contains a vinyl pyridine terpolymer and a butadiene latex.

18. A product as defined in claim 14 wherein said coating also contains a resinous material selected from the group consisting of polyamides, polyesters, polyepoxides and mixtures of polyamides and polyurethane.

19. A product as defined in claim 14 wherein said coating also contains an anchoring agent.

20. An elastomeric product comprising an elastomer as the continuous phase and bundles of glass fibers distributed within the continuous phase of the elastomer, said bundles of glass fibers having a thin size coating on the surfaces of the glass fiber filaments forming the bundle and an impregnant in the bundle to enhance the bonding relationship between the elastomer and the bundles, said impregnant comprising a resinous material formed by the reaction of an aldehyde with a phenolic compound having a substituent selected from the group consisting of mercapto and thio substituents in the meta or para positions.

21. An elastomeric product as defined in claim 20 wherein said phenolic compound is selected from the group consisting of mercaptophenol, 4-(methylthio) metacresol and 4-(methylthio) phenol.

22. An elastomeric product as defined in claim 20 wherein said impregnant also contains an elastomer.

23. A glass fiber bundle having an impregnant in the bundle of glass fibers wherein said impregnant comprises a resinous material formed by the condensation reaction of an aldehyde with a phenolic compound having a substituent selected from the group consisting of mercapto and thio substituents in the meta or para positions.

24. A glass fiber bundle as defined in claim 23 wherein said phenolic compound is selected from the group consisting of mercaptophenol, 4-(methylthio) metacresol and 4-(methylthio) phenol.

25. A glass fiber bundle as defined in claim 23 wherein said impregnant also contains an elastomer.

26. A glass fiber bundle as defined in claim 23 wherein said impregnant also contains a vinyl pyridine-butadiene-styrene terpolymer.

27. A glass fiber bundle as defined in claim 23 wherein said impregnant also contains a natural rubber latex.

28. A glass fiber bundle as defined in claim 23 wherein said impregnant also contains a resin selected from the group consisting of polyamides, polyesters, polyepoxides and a mixture of polyamides with polyurethane.

29. A glass fiber bundle as defined in claim 23 wherein said impregnant also contains an anchoring agent.

30. A glass fiber bundle formed of a plurality of glass fiber filaments, each of said filaments having a thin size coating on the surfaces thereof, and an impregnant in the bundle, wherein the impregnant comprises a resinous material formed by the condensation reaction of an aldehyde with a phenolic compound having a substituent selected from the group consisting of mercapto and thio substituents in the meta or para positions.

31. A glass fiber bundle as defined in claim 30 wherein said phenolic compound is selected from the group consisting of mercaptophenol, 4-(methylthio) metacresol and 4-(methylthio) phenol.

32. A glass fiber bundle as defined in claim 30 wherein said impregnant also contains an elastomer.

33. A glass fiber bundle as defined in claim 30 wherein said impregnant also contains a natural rubber latex.

* * * * *